(12) United States Patent
Groth

(10) Patent No.: US 11,294,346 B2
(45) Date of Patent: Apr. 5, 2022

(54) METHOD FOR PRODUCING A PRODUCT COMPILATION

(71) Applicant: Uwe Groth, Wernetshausen (CH)

(72) Inventor: Uwe Groth, Wernetshausen (CH)

(73) Assignee: FERAG AG, Hinwil (CH)

( * ) Notice: Subject to any disclaimer, the term of this patent is extended or adjusted under 35 U.S.C. 154(b) by 133 days.

(21) Appl. No.: 14/975,143

(22) Filed: Dec. 18, 2015

(65) Prior Publication Data

US 2016/0179078 A1 Jun. 23, 2016

(30) Foreign Application Priority Data

Dec. 23, 2014 (CH) ..................................... 02018/14

(51) Int. Cl.
| | | |
|---|---|---|
| *G05B 19/18* | (2006.01) | |
| *B65H 43/00* | (2006.01) | |
| *G05B 19/418* | (2006.01) | |
| *B65H 39/02* | (2006.01) | |

(52) U.S. Cl.
CPC .............. *G05B 19/18* (2013.01); *B65H 39/02* (2013.01); *B65H 43/00* (2013.01); *G05B 19/4183* (2013.01); *B65H 2301/4311* (2013.01); *B65H 2553/52* (2013.01); *B65H 2557/13* (2013.01); *B65H 2701/1244* (2013.01); *B65H 2701/12422* (2013.01); *G05B 2219/23231* (2013.01); *G05B 2219/31296* (2013.01); *G05B 2219/31304* (2013.01); *G05B 2219/31309* (2013.01); *G05B 2219/40006* (2013.01); *Y02P 90/02* (2015.11)

(58) Field of Classification Search
CPC ................ G05B 19/18; G05B 19/4183; G05B 2219/40006; G05B 2219/31296; G05B 2219/31304; G05B 2219/23231; G05B 2219/31309; B65H 39/02; B65H 43/00; B65H 2557/13; B65H 2553/52; B65H 2701/1244; B65H 2301/4311; B65H 2701/12422; Y02P 90/10

See application file for complete search history.

(56) References Cited

U.S. PATENT DOCUMENTS

| | | |
|---|---|---|
| 5,374,231 A | 12/1994 | Obrist |
| 9,789,572 B1 | 10/2017 | Cheung et al. |
| 2003/0170336 A1 | 9/2003 | Caretta et al. |
| 2004/0158810 A1* | 8/2004 | Dove ...................... G06F 40/10 717/100 |

(Continued)

FOREIGN PATENT DOCUMENTS

| | | | |
|---|---|---|---|
| DE | 10 2011 087 274 A1 | 5/2013 | |
| EP | 1 349 108 A1 | 10/2003 | |

(Continued)

*Primary Examiner* — Jason Lin
(74) *Attorney, Agent, or Firm* — Pauley Erickson & Swanson

(57) ABSTRACT

The invention relates to a method for producing a product compilation, which comprises at least one main product and at least one or more subproducts. The main product or a subproduct is provided as a leading object with machine-readable data, which comprise a process key (1), which comprises at least one uniform resource identifier (URI, 2) and a control element region (3), wherein, in the production process, at least one machine recognizes the process key (1) and a work step of the machine is triggered by the process key (1).

24 Claims, 3 Drawing Sheets

(56) References Cited

U.S. PATENT DOCUMENTS

| | | |
|---|---|---|
| 2005/0092839 A1 | 5/2005 | Oram |
| 2006/0151592 A1 | 7/2006 | Poor |
| 2006/0168644 A1 | 7/2006 | Richter et al. |
| 2006/0224250 A1 | 10/2006 | Callaghan |
| 2007/0159330 A1 | 7/2007 | Chakraborty et al. |
| 2009/0122347 A1* | 5/2009 | Utsubo ............... G06F 21/608 358/1.16 |
| 2009/0175453 A1* | 7/2009 | Shinbori ............. H04L 9/0891 380/277 |
| 2009/0211479 A1 | 8/2009 | Foley et al. |
| 2010/0031840 A1* | 2/2010 | Steffen ................ B41F 13/46 101/483 |
| 2010/0191352 A1* | 7/2010 | Quail ................. H04L 12/2809 700/90 |
| 2011/0023416 A1 | 2/2011 | Leu et al. |
| 2011/0025458 A1 | 2/2011 | Rokhsaz et al. |
| 2011/0079159 A1 | 4/2011 | Silberbauer et al. |
| 2012/0029683 A1 | 2/2012 | Keller et al. |
| 2012/0073247 A1 | 3/2012 | Kuenzli |
| 2013/0032634 A1* | 2/2013 | McKirdy ............. G16H 40/67 235/375 |
| 2013/0061337 A1 | 3/2013 | Zimberoff et al. |
| 2013/0096713 A1* | 4/2013 | Takizawa ............ B65G 61/00 700/224 |
| 2014/0005817 A1 | 1/2014 | Brewer et al. |
| 2014/0135969 A1 | 5/2014 | Groth |
| 2014/0282032 A1 | 9/2014 | Brown et al. |
| 2015/0088620 A1* | 3/2015 | Wittek ............... G06Q 30/0207 705/14.1 |
| 2015/0102100 A1* | 4/2015 | Hattrup ............... G06Q 50/28 235/375 |
| 2015/0134115 A1 | 5/2015 | Gong et al. |
| 2015/0195101 A1* | 7/2015 | Rashid ................. G08C 17/02 700/90 |
| 2015/0237165 A1 | 8/2015 | Evans |

FOREIGN PATENT DOCUMENTS

| | | | |
|---|---|---|---|
| EP | 1 699 020 A1 | 9/2006 | |
| EP | 1 911 583 A1 | 4/2008 | |
| EP | 2 333 627 A2 | 6/2011 | |
| EP | 2 388 670 A1 | 11/2011 | |
| JP | WO 2014185041 A1 * | 11/2014 | ............ G08C 17/02 |
| WO | WO 01/80146 A1 | 10/2001 | |
| WO | WO-0180146 A1 * | 10/2001 | ....... G06K 19/07758 |
| WO | WO 2006/130691 A2 | 12/2006 | |
| WO | WO 2008/144945 A2 | 12/2008 | |

* cited by examiner

METHOD FOR PRODUCING A PRODUCT COMPILATION

CROSS-REFERENCE TO RELATED APPLICATION

Swiss Patent Application 02018/14, filed 23 Dec. 2014, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The invention relates to a method for producing a product compilation which comprises at least one main product and at least one or more subproducts.

Discussion of Related Art Product compilations are produced by machine in large editions, as described in various intellectual property of the applicant. A product compilation can relate, for example, to a printed product having various printed product supplements or a shopping bag having various customer articles. An edition of a product compilation can be adapted, for example, to a specific group of persons. For example, printed products for households are provided with household advertising or the same printed products for industrial operations are provided with industrial advertising. Corresponding control tasks are to be executed during the machine production of product compilations, to obtain the product compilations in the desired manner.

A method for producing a printed product is known from EP 1 911 583. Printed products produced in a high-performance printing process are provided with an identification means, which comprises an item of product-specific information, which can be individualized. At least two subsequent individualization steps are carried out. Control instructions for the at least two further individualization steps are incorporated in the identification means, so that the identification means enable the association with the respective product of the information to be added in the at least two further subsequent individualization steps.

SUMMARY OF THE INVENTION

One object of the invention is to specify a method for producing a product compilation, which is more flexible and is easily adaptable.

This object is achieved by the features of the independent patent claims. Advantageous embodiments of the solution according to the invention result from the dependent claims.

In the method according to the invention for producing a product compilation, which comprises at least one main product and at least one or more subproducts, at least the main product is provided with an identification means as the leading product. The identification means comprises a process key, which in turn comprises at least one uniform resource identifier (URI) and a control element region. In the production process, at least one machine recognizes the process key and at least one work step of the machine is triggered by the process key.

According to one further embodiment, the product compilation comprises a receptacle container, preferably a shopping bag, for accommodating a customer-specific product compilation.

The at least one work step is preferably triggered by an item of control information provided by the control element region, and according to a further embodiment is also controlled thereby.

In this case, the control information is preferably stored in the control element region of the process key or it is queried via a data network from at least one control information databank in accordance with an instruction stored in the control element region of the process key.

The control element region can comprise at least one machine-specific control element having a machine identification and a machine control instruction associated with the machine.

Alternatively thereto, the control element region can comprise at least one machine-specific control element having a machine identification and a query instruction, which is associated with the machine, for a machine control instruction. Such a control element region, in contrast to the above-mentioned statements, will not trigger and possibly control a work step of a machine directly by means of the provided control information, but rather a corresponding control instruction is queried via a data network from at least one control information databank on the basis of an instruction stored in the control element region of the process key.

The machine-readable data can advantageously be selected from the group of: i) machine-readable data applied directly onto or at the product and ii) machine-readable data associated with the product detachably, temporarily, and spatially in the immediate vicinity.

According to further preferred embodiments, the process key comprises at least one prefixed metatag (MD in short) for the producer-specific identification of the further elements of the process key. It has been shown that the metatag, in the case of production distributed to multiple producers, enables the producer-specific further elements of the process key to be identified very rapidly and easily. By way of the access to the metatag, a machine of a producer can recognize very rapidly whether or not the relevant associated process key is intended for it or the producer.

The process key can additionally comprise at least one security element, which is used for decrypting the items of information, which are stored in the control element region, and/or the uniform resource identifier.

The identification means according to the present invention are preferably designed as a machine-readable two-dimensional or matrix barcode or as an RFID tag, wherein they are particularly preferably printed by a printing process directly onto a main product or are stored in a data storage process in an RFID attached to the main product.

The present invention enables at least two machines at separate locations to participate in the production process. The advantages which result therefrom are described in greater detail hereafter in a general form.

In one preferred embodiment of the present invention, at least one subproduct is added to the main product in the course of a conveyor section.

The conveyor section comprises at least one conveyor system for conveying the main product. Machines are arranged along the conveyor system to provide the main product with one or more subproducts and to form a product compilation.

According to one embodiment of the method according to the invention, the product compilation comprises a printed product, which is preferably composed of a main product and one or more subproducts.

In one variant, the conveyor system is configured for conveying printed products. The machines arranged along the conveyor system are configured to add one or more subproducts to the printed products, which are provided in the form of main products and/or subproducts. The printed products can be newspapers, weekly magazines, monthly magazines, etc. The subproducts can be, for example, advertising brochures, product sheets, data carriers, product samples, etc.

In one variant, the conveyor system is configured for conveying receptacle containers. The receptacle containers can be embodied in the form of plastic containers, cardboard containers, etc., or as shopping bags, wherein the containers comprise boxes, packets, baskets, and the like. The subproducts to be added to the receptacle containers can relate to mail-order products such as clothing, food, electronics articles, pharmaceuticals, mail-order articles, customer articles, etc. The product compilation can relate to a customer-specific order of products of all types.

In a further variant, the conveyor system is especially configured for conveying shopping bags. The machines arranged along the conveyor system are configured to add one or more subproducts to the shopping bags. The shopping bags can be paper bags, fabric bags, plastic bags, etc.

The main products can be finished products such as consumer goods, for example, electrical appliances or luxury articles. According to further embodiments, these can also be provided in incomplete form and can possibly still be supplemented with subproducts.

The subproducts can be advertising articles, customer articles, supplements and accessories for the main products, which can in turn also be finished products, packaging material, data carriers, product samples, etc.

The conveyor section can be interrupted once or multiple times, for example, by buffers or stores. It is also interrupted if one part of the production is performed at a first location and a further part is performed at a second location.

In general, it can be stated that the present invention enables the segmenting of the production, or of the method for producing a product compilation, since no central higher-order control system is necessary, which has to give all relevant control instructions for the respective product at the right time to the correct machine. At least one main product or at least one or more subproducts carry these control or query instructions with them and thus make a central higher-order control system unnecessary.

According to the present invention, a plurality of main products are preferably processed in one product sequence in the course of the conveyor section by the at least one machine.

The uniform resource identifier (URI) preferably comprises a pointer, which points to the machine-readable data themselves, to at least one machine, or to at least one control information databank, which is accessible via a data network.

According to the present invention, a suitable system is provided for carrying out the above-mentioned method.

According to the present invention, product compilations can be produced in the form of printed products, wherein they comprise at least one main product or a subproduct having machine-readable data, which in turn comprise at least one process key, which comprises at least one uniform resource identifier (URI) and a control element region, wherein the machine-readable data are preferably formed as a machine-readable two-dimensional barcode or matrix barcode or as an RFID tag.

The present invention has proven to be particularly advantageous in the production of completely or partially individualized products. In print processing, it enables very simple and efficient production on the correct route of customer-specific and/or region-specific products.

In a further embodiment, product compilations are compiled in the form of receptacle containers, preferably in the form of shopping bags, which comprise at least one main product or a subproduct having machine-readable data, which in turn comprise at least one process key, which comprises at least one uniform resource identifier (URI) and a control element region. The machine-readable data are also preferably formed here as a machine-readable two-dimensional barcode or matrix barcode or as an RFID tag.

In general, in the case of the segmented production according to the present invention, the machines which participate in the production process can be set up at separate locations. Thus, machines at a first location can perform work steps which are required for the production process. The partially finished product compilations can be transported from the first location to a second location, wherein machines at the second location perform further work steps which are required for the production process. The production process can thus be distributed to different locations. Greatly varying machines can thus be used for the production process. The allocation to various locations can also be used for improving the security, for example, so as not to give out customer data, which are required for the addressing of product compilations, as an overall data pool at a single location, but rather to provide only data sets which are currently necessary at individual locations, for example, using a control information databank as described.

The control information databank can fundamentally be constructed and accessible as a distributed databank in a "cloud". In particular a high level of availability of control information data may thus be achieved. The data stored in the control information databank may be adapted at short notice and work steps in the production process, which relate to data of the control information data bank, may be changed at short notice, for example, to add a supplement adapted to a daily update in the case of printed products. For this purpose, it is not necessary to make contact with the location, at which the production process for the production of a product compilation is presently running. For example, a large edition can have been allocated into multiple parallel production processes. Making contact with the individual locations to change the work steps would be time-consuming and complicated.

The control information databank can be available via the Internet with access via the uniform resource identifier (URI), wherein the information flow is possible in both directions. In this manner, data can be queried, but also stored in the databank.

An authentication and/or an encryption can be provided for the access to the control information databank, which can be defined, for example, per location, per machine class, per machine, etc.

Simple and high availability of the items of control information is enabled for greatly varying locations by way of the access via the Internet. At the same time, the data security can be established individually and therefore in a very detailed manner for each process key.

Multiple control information databanks can be provided, to still better fulfill requirements such as availability, scaling ability, security, etc.

The machine-readable data, in one variant, can be attached directly on the main product or subproduct, i.e., directly on a printed product or on a shopping bag, for example, glued or printed on the main product or subproduct, enclosed therein, etc.

The machine-readable data can, in one variant, be assigned to the main product or subproduct, i.e., a printed product or a shopping bags, detachably, temporarily, and spatially in the immediate vicinity, for example, attached to a clamp, a gripper, a transport device, etc. for conveying the main product or subproduct. During the conveyance of the main product or subproduct, the machine-readable data is associated therewith. This association is canceled after the conveying by a conveyor device.

Machine-readable data can be both attached to the main product or subproduct and associated therewith in the immediate vicinity.

The machine-readable data can be attached to the main product or subproduct in the form of a barcode or two-dimensional code, for example, as an EAN barcode (EAN: European article number), as a UPC barcode (UPC: universal product code), as a QR code (QR: quick response), as an Aztex code, etc.

The machine-readable data can be attached to the main product or subproduct in the form of an RFID tag (RFID: radio frequency identification). A passive or active RFID tag can be provided, which can be embodied as only readable, only writable, or both readable and also writable. By writing data, machines can establish parameters of the performed work step, for example, the tolerance with which a specific work step was performed. On the basis of the established data, subsequent machines can optimize the subsequent work steps, for example, the printing with an address, in consideration of the tolerance with which a main product or subproduct was trimmed in a preceding work step.

The production process for the production of a product compilation can be applied in the field of high-performance machines, which can perform several hundred, several thousand, tens of thousands, etc. of product compilations per hour, for example.

The production process for the production of a product compilation can be applied in the field of warehousing and logistics, wherein a product compilation is formed from multiple articles, for example, according to a customer order. Such a customer-specific product compilation can also be used for the production of a product in customer-specific configuration, if a customer-specific order for it is provided.

In one variant, the uniform resource identifier (URI) comprises a pointer, which points to the machine-readable data themselves. Thus, for example, the production security may be increased. The product status can also be changed after a processing step, in that the corresponding information is transmitted to the control information databank and assigned to the URI therein. The data for a URI can also be queried at any time during the production process. If the production planning is to be reconfigured at short notice, it is thus sufficient to change the corresponding properties of a URI. The production thus becomes very flexible and can be adapted at any time, for example, to changed customer wishes.

In one variant, the uniform resource identifier (URI) comprises a pointer, which points to at least one machine. The machine can have a control information databank, which can be accessed via the uniform resource identifier (URI).

In one variant, the uniform resource identifier (URI) comprises a pointer, which points to at least one control information databank, which is accessible via a data network. The control information databank can be available on a server, which is accessible via the Internet, and which can be accessed via the uniform resource identifier (URI) and via which items of information can be exchanged.

BRIEF DESCRIPTION OF THE DRAWINGS

The invention will be explained hereafter on the basis of figures, which merely illustrate exemplary embodiments. In the figures.

DESCRIPTION OF PREFERRED EMBODIMENTS

Figure 1:
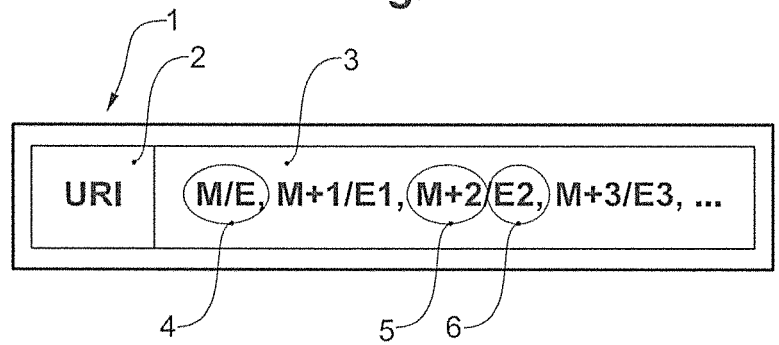
FIG. 1 shows a process key according to the invention comprising a uniform resource identifier (URI) and a control element region.

FIG. 1 shows a process key 1 according to the invention. The process key 1 comprises a uniform resource identifier (URI) 2 and a control element region 3.

The uniform resource identifier 2 is constructed as follows according to the known scheme:

URI=scheme ":" hier-part ["?" query] ["#" fragment]

The components of the uniform resource identifier 2 are listed in the following example.

foo://example.com:8042/over/there?name=ferret#nose

The resource comprises a scheme, which defines the context and identifies the type of the URI. Known schemes are, for example, the protocols HTTP and FTP. A colon and a path for locating the resource follow directly thereon.

The path comprises an authority (i.e., for example, example.com:8042), a path (i.e., for example, /over/there), a query (i.e., for example, ?name=ferret), and a fragment (i.e., for example, #nose).

The authority can identify a host and can contain user inputs. The path contains specifications which identify a resource. The query contains data for identifying resources, which cannot be precisely located by the specification of the path. The fragment references a point within a resource.

The control element region 3 comprises, for example, a list having pairs relating to machine identifications M, 4, 5 and machine control-instructions E, 6.

The machine identifications M, 4, 5 can identify machine classes or specific machines, for example, an insertion machine for inserting subproducts into a main product, a film wrapping machine for wrapping a product compilation in film, an addressing machine for addressing a product compilation, etc.

The machine control instructions 6 can identify work steps which are to be executed by a machine or a machine class or a specific machine, for example, the insertion of a specific subproduct at a specific point of the main product, the wrapping in film of a product compilation with a transparent, semitransparent, or opaque film, the addressing of the product compilation with a specific address, etc.

During the production of a product compilation comprising a main product and multiple subproducts, the main product or a subproduct is provided as the leading object with machine-readable data, which comprise the process key 1. The process key 1 is recognizable to the machines participating in the production of product compilations, wherein in each case one machine accesses the process key 1 and a work step defined in the process key is triggered.

Because the main product or subproduct is provided with the process key 1, in one variant, the production of the product compilation can be defined by only the process key 1 alone and can be performed without further access to external data. This enables a particularly high throughput during the production of product compilations, since the access to external data would slow down the production because of the time required to carry out the access.

Since the process key 1 comprises a uniform resource identifier URI 2, work steps for producing product compilations can be defined at the run time. For example, at the run time, during a work step for attaching a delivery address to the product compilation, the relevant address can be established by access to data which are defined by the uniform resource identifier 2. This enables the data security to be improved, since, for example, all of the customer data sets do not have to be available at a production location, but rather only the customer data sets which are required for the production of the present product compilation.

Work steps may be defined at the run time by way of the use of the uniform resource identifier 2. For example, it may be noted in the process key 1 that wrapping in film of the product compilation is to be performed, wherein it is first ascertained at the run time, by access to data defined by the uniform resource identifier 2, whether a transparent, semitransparent, or opaque film wrapping is to be performed.

Figure 2:
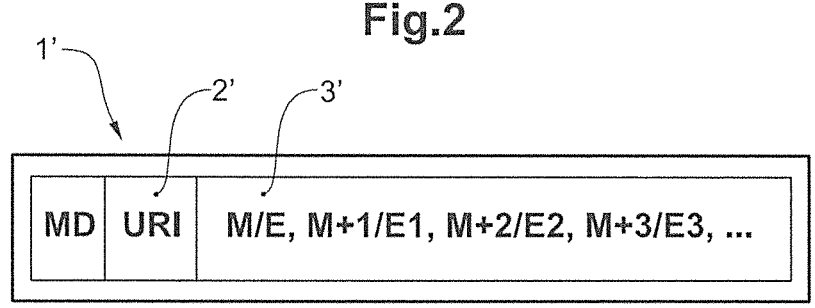
FIG. 2 shows a process key according to the invention comprising a metatag, a uniform resource identifier (URI), and a control element region.

FIG. 2 shows a process key 1' according to the invention, wherein a metatag MD is prefixed to a uniform resource identifier 2' and a control element region 3. The metatag MD enables the producer-specific identification of the further elements of the process key. By way of the access to the metatag MD, a machine can recognize very rapidly whether the relevant process key 1' comprises a uniform resource identifier 2' and a control element range 3', to trigger a work step of the machine. The throughput during the production of product compilations may thus be increased.

Figure 3:
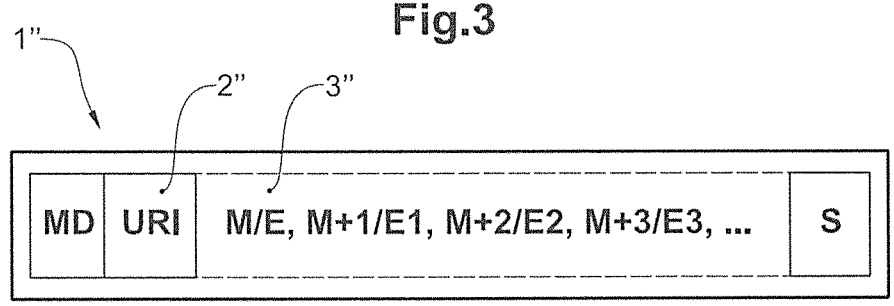
FIG. 3 shows a process key according to the invention comprising a metatag, a uniform resource identifier (URI), a control element region, and a key region.

FIG. 3 shows a process key 1" according to the invention, wherein a security element S is affixed to uniform resource identifier 2" and a control element region 3". The security element S is used for decrypting the items of information stored in the control element region 3" and/or the uniform resource identifier 2". The security element can define an encryption algorithm, which is required for the decryption, for example, a symmetrical algorithm or an asymmetrical algorithm. The key required for the decryption, for example, a symmetrical key or the private key of an asymmetrical key, can have been stored in the relevant machine in an initialization step.

Figure 4:
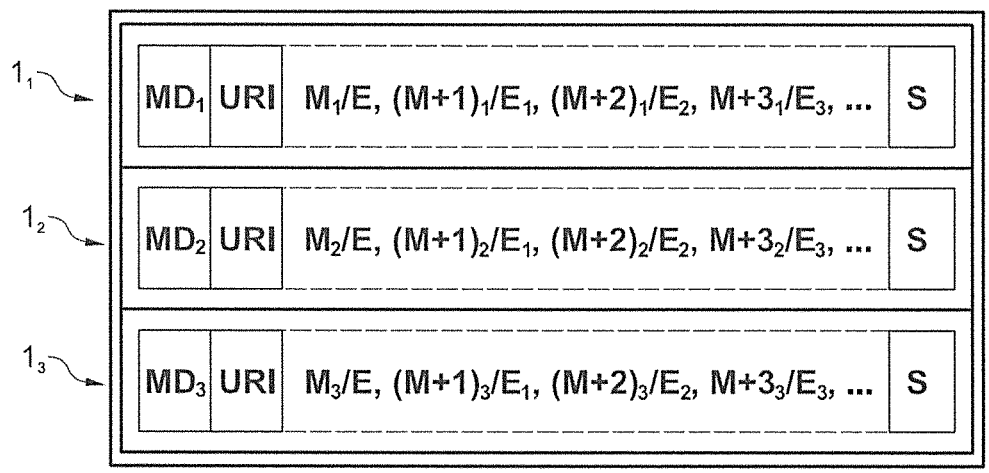
FIG. 4 shows an arrangement having multiple process keys n according to the invention, each comprising a metatag, a uniform resource identifier (URI), a control element region, and a key region.

FIG. 4 shows a plurality of process keys $1_1$, $1_2$, $1_3$, which are contained in the machine-readable data, with which the main product or the subproduct is provided. In FIG. 4, three process keys $1_1$, $1_2$, $1_3$ are shown, however, fewer or many more process keys can be contained in the machine-readable data. Work steps can be defined by the multiple process keys $1_1$, $1_2$, $1_3$ per machine or machine class, which are to be carried out by the relevant machine or a machine of a machine class. In particular by access to the metatag $MD_1$, $MD_2$, $MD_3$, the respective machine can rapidly establish whether work steps which are to be executed are defined in process key $1_1$, $1_2$, $1_3$.

Figure 5:
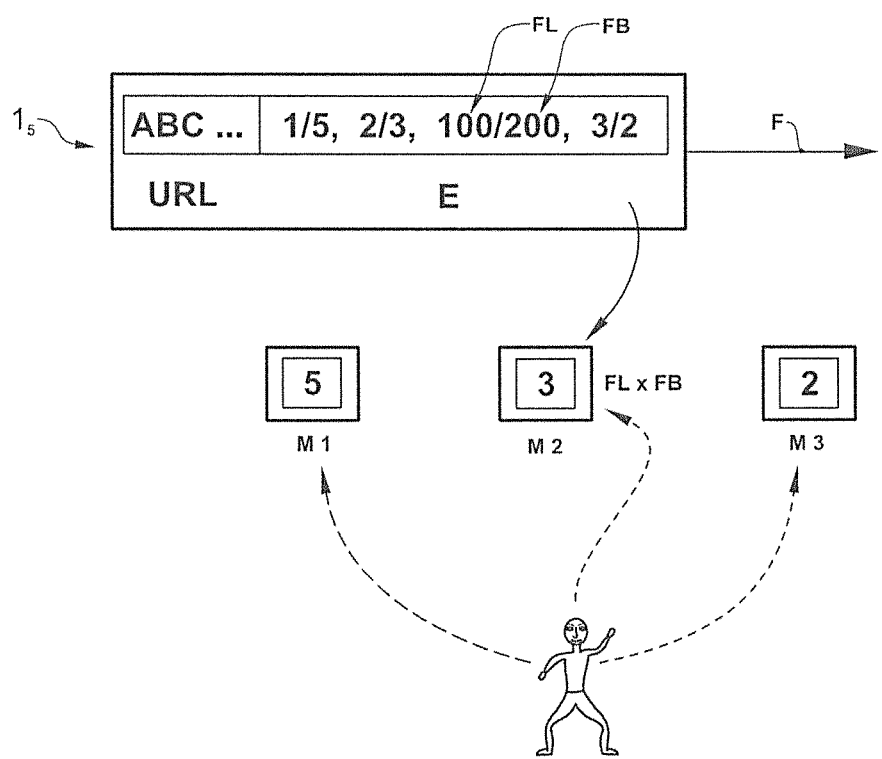
FIG. 5 shows a process key according to the invention in interaction with machines for producing a product compilation.

FIG. 5 shows a process key $1_5$, which is contained in machine-readable data, with which a main product or subproduct is provided, which is conveyed in a conveyance direction from a machine M1 to a machine M2 and to a machine M3. As schematically shown in FIG. 5, the process key comprises a URL (unified resource locator) having the value ABC . . . and properties E having the values 1/5, 2/3, 100/200, 3/2. As schematically shown in FIG. 5, the property 1/5 relates to the machine M1, using which the work step 5 is to be carried out. The work step 5 can be defined on the machine M1 and can relate to adding a specific subproduct, for example. As schematically shown in FIG. 5, the property 2/3 relates to the machine M2, using which the work step 3 is to be carried out, which relates in the example of FIG. 5 to a cutting function to a specific size FL×FB. As schematically shown in FIG. 5, the size FL×FB, to which the trimming is to be carried out, is to be looked up in the properties. In the example of FIG. 5, the size FL×FB=100×200 of a specific unit, which is used for the machine M2, for example, the unit centimeters. As schematically shown in FIG. 5, the property 3/2 relates to the machine M3, using which the work step 2 is to be carried out. The work step 2 of the machine M3 can relate, for example, to the insertion of a specific subproduct or the film wrapping with a transparent, semitransparent, or opaque film.

The operator who is schematically shown in FIG. 5 can optionally, as indicated by the dashed arrows, engage in the machines, query data, or monitor processing steps to be executed.

Figure 6:
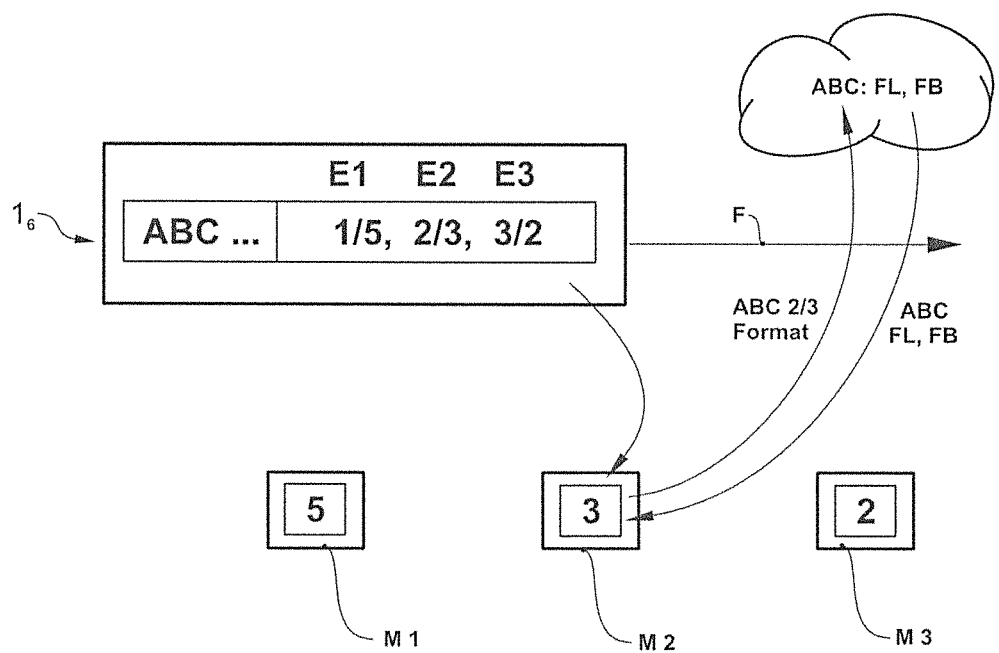
FIG. 6 shows a process key according to the invention in interaction with machines for producing a product compilation, and also the interaction of a machine with a data cloud.

FIG. 6 shows a process key $1_6$, which is contained in machine-readable data, with which a main product or subproduct is provided, which is conveyed in a conveyance direction from a machine M1 to a machine M2 and to a machine M3. As schematically shown in FIG. 6, the process key comprises a URL having the value ABC . . . and properties E having the values 1/5, 2/3, 3/2. The properties E1 having the values 1/5 and E2 having the values 3/2 relate to the machine M1 and the machine M3, which have to carry out the work step 5 and the work step 2. The property E2 having the values 2/3 relates to the machine M2, which has to carry out the work step 3. In the example shown in FIG. 6, the work step 3 requires additional specifications, for example, the dimension specification of the trimming of a main product or subproduct. As shown in FIG. 6, the machine M2 carries out a query, using the URL ABC . . . , in a control information databank, shown as a "cloud", to retrieve the required specifications with respect to the dimension specification FL, FB, which is required to carry out the trimming.

I claim:

1. A method for producing a product compilation comprising at least one main product and at least one or more subproducts, the method comprising:
   providing the main product or the subproduct as a leading product with machine-readable data, which includes a process key, which comprises at least one uniform resource identifier and a control element region,
   recognizing said process key in the production process by at least one machine,
   triggering a work step of said at least one machine by said process key,
   defining said work step at a production run time for the product compilation by accessing data that are defined by the uniform resource identifier, wherein the uniform resource identifier comprises a pointer that points to at least one control information databank accessible via a data network, and carrying out said work step on said product compilation, wherein in said work step the product compilation is physically modified.

2. The method according to claim 1, wherein the product compilation comprises a printed product, which includes the main product and one or more subproducts.

3. The method according to claim 1, wherein the product compilation comprises a shopping bag, for accommodating a customer-specific product compilation.

4. The method according to claim 1, wherein the work step is triggered by an item of control information provided by the control element region.

5. The method according to claim 4, wherein the control information is stored in the control element region of the process key.

6. The method according to claim 4, wherein the control information is queried via a data network from at least one control information databank in accordance with an instruction stored in the control element region of the process key.

7. The method according to claim 1, wherein the control element region comprises at least one machine-specific control element having a machine identification and a machine control instruction assigned to the machine.

8. The method according to claim 1, wherein the control element region comprises at least one machine-specific control element having a machine identification and a query instruction, which is assigned to the machine, for a machine control instruction.

9. The method according to claim 1, wherein the machine-readable data are selected from the group of: i) machine-readable data attached directly onto or at the printed product and ii) machine-readable data associated detachably, temporarily, and spatially in the immediate vicinity of the printed product.

10. The method according to claim 1, wherein the process key comprises a prefixed metatag for the producer-specific identification of further elements of the process key.

11. The method according to claim 1, wherein the process key comprises a security element, which is used for decrypting the items of information stored in the control element region and/or the uniform resource identifier.

12. The method according to claim 1, wherein the machine-readable data are stored as a machine-readable two-dimensional barcode or matrix barcode or in an RFID tag.

13. The method according to claim 12, wherein the machine-readable data are printed in a printing process directly onto a main product or subproduct or are stored in a data storage process in an RFID tag, which is attached to the main product or subproduct.

14. The method according to claim 1, wherein at least two machines at separate locations participate in the production process.

15. The method according to claim 1, wherein at least one subproduct is added to the main product in the course of a conveyor section.

16. The method according to claim 1, wherein a plurality of main products are processed by the at least one machine in a product sequence in the course of the conveyor section.

17. The method according to claim 1, wherein the pointer comprises a transfer protocol path which is accessible via a data network.

18. The method according to claim 1, wherein the physical modification of the product compilation during the work step includes adding subproducts, wrapping the product compilation, printing an address, or trimming.

19. A shopping bag, comprising at least one main product or subproduct having machine-readable data, the machine-readable data comprising at least one process key, which comprises at least one uniform resource identifier and a control element region, wherein the process key is recognizable in a production process by at least one machine, wherein a work step of said at least one machine is triggerable by said process key, the shopping bag being physically modified in said work step, wherein the work step is defined at production run time by accessing data that are defined by the uniform resource identifier, and wherein the uniform resource identifier comprises a pointer that points to at least one control information databank accessible via a data network.

20. The shopping bag according to claim 19, wherein the machine-readable data is formed as a machine-readable two-dimensional barcode or matrix barcode or as an RFID tag.

21. A printed product comprising at least one main product or subproduct having machine-readable data, the machine-readable data comprising at least one process key, which comprises at least one uniform resource identifier and a control element region, wherein the process key is recognizable in a production process by at least one machine, wherein a work step of said at least one machine is triggerable by said process key, the printed product being physically modified in said work step, wherein the work step is defined at production run time by accessing data that are defined by the uniform resource identifier, and wherein the uniform resource identifier comprises a pointer that points to at least one control information databank accessible via a data network.

22. The printed product according to claim 21, wherein the machine-readable data is formed as a machine-readable two-dimensional barcode or matrix barcode or as an RFID tag.

23. A container made of plastic or cardboard, comprising at least one main product or subproduct having machine-readable data, the machine-readable data comprising at least one process key, which comprises at least one uniform resource identifier and a control element region, wherein the process key is recognizable in a production process by at least one machine, wherein a work step of said at least one machine is triggerable by said process key, the container being physically modified in said work step, wherein the work step is defined at production run time by accessing data that are defined by the uniform resource identifier, and wherein the uniform resource identifier comprises a pointer that points to at least one control information databank accessible via a data network.

24. The container according to claim 23, wherein the machine-readable data is formed as a machine-readable two-dimensional barcode or matrix barcode or as an RFID tag.

* * * * *